United States Patent [19]

Starke et al.

[11] Patent Number: 4,903,004
[45] Date of Patent: Feb. 20, 1990

[54] ALL-WEATHER DIGITAL DISTANCE MEASURING AND SIGNALLING SYSTEM

[76] Inventors: Jeffrey W. Starke, 10920 SW. 70th Ter., Miami, Fla. 33156; Gregory Dalkranian, 640 SW. 73rd Ave., Miami, Fla. 33144

[21] Appl. No.: 927,110

[22] Filed: Nov. 5, 1986

[51] Int. Cl.$^4$ .......................... B60Q 1/00; G08G 1/16
[52] U.S. Cl. ................................ 340/425.5; 340/903; 340/901; 340/436; 180/167
[58] Field of Search ............... 340/52 R, 52 H, 901, 340/903, 988, 61; 180/167, 271, 274; 364/444, 516

[56] References Cited

U.S. PATENT DOCUMENTS

| | | | |
|---|---|---|---|
| 3,934,252 | 1/1976 | Ross et al. | 340/52 H |
| 4,240,152 | 12/1980 | Duncan et al. | 340/901 |
| 4,278,962 | 7/1981 | Lin | 340/52 H |
| 4,626,850 | 12/1986 | Chey | 340/903 |

Primary Examiner—Donnie L. Crosland
Attorney, Agent, or Firm—John-Paul J. Violette

[57] ABSTRACT

An all-weather digital distance measuring and signalling system for a vehicle specifically intended for accurately measuring distances of obstructions, such as behind a truck as it is being backed up. An array of transducer devices having independent sending and receiving capabilities are mounted on a support frame, such as a rear bumper. A pulsed signal emanating from a transistor amplifier circuit is timed as it is converted to an ultrasonic wave signal by each transducer device, simultaneously emitted and received by said transducer devices, and returned as a pulsed signal. Said signal being returned after bouncing back from an obstruction and the time of said return being converted into a distance value by digital converter circuitry. Said digital converter circuitry in turn sends said signal to a digital display device. In addition to displaying a digital readout, said display device emits a periodic beeping sound and flasher tied to the signal and increasing in speed until a distance of 1.9 feet is acquired, at which time the beeper becomes a solid tone.

20 Claims, 5 Drawing Sheets

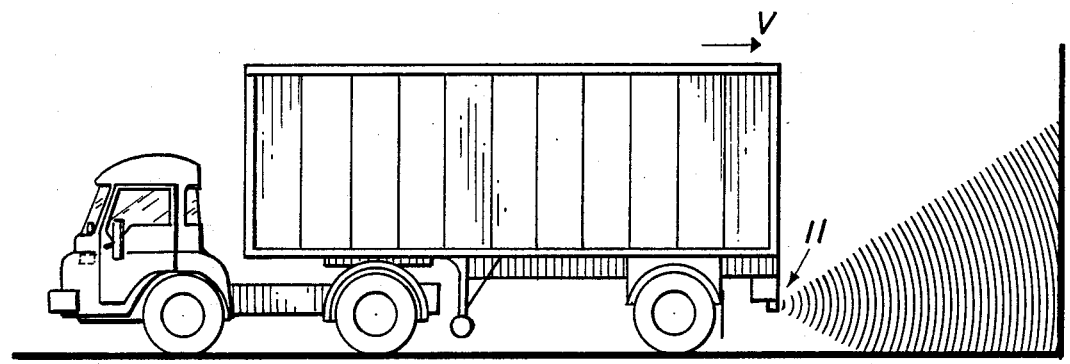
FIG. 1
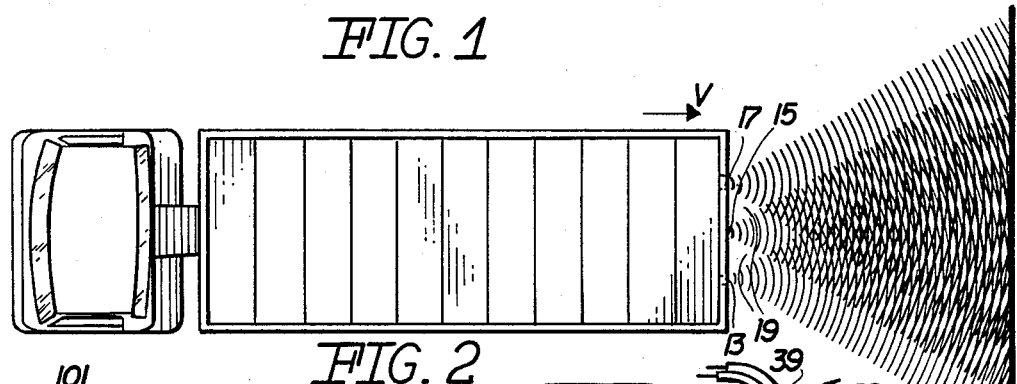
FIG. 2
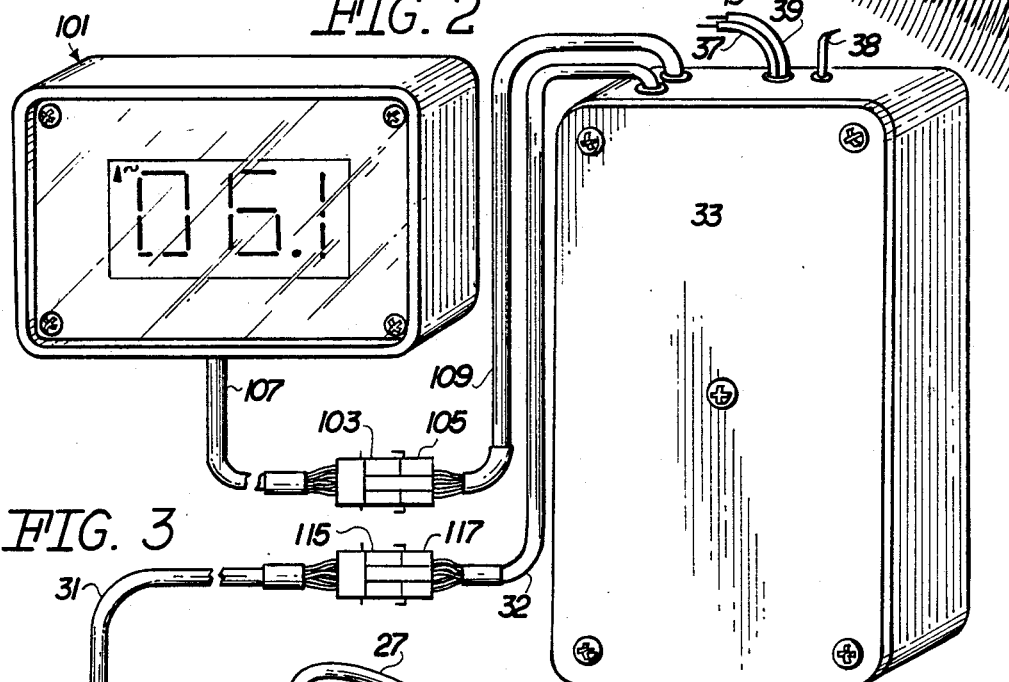
FIG. 3
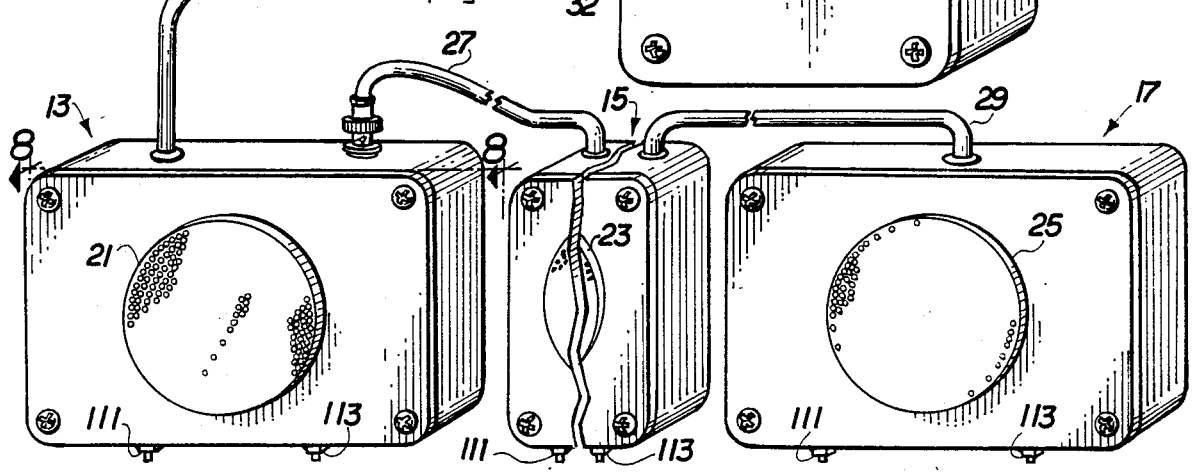

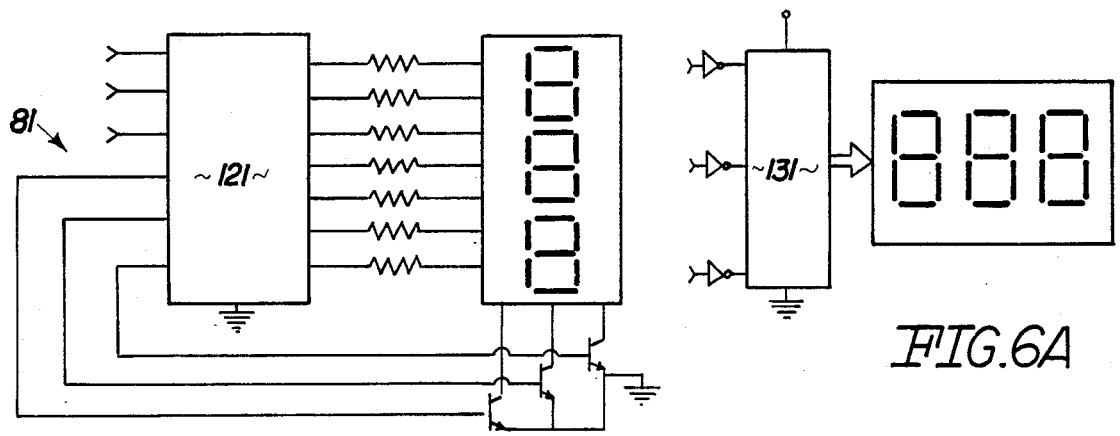
FIG. 5
FIG. 6A
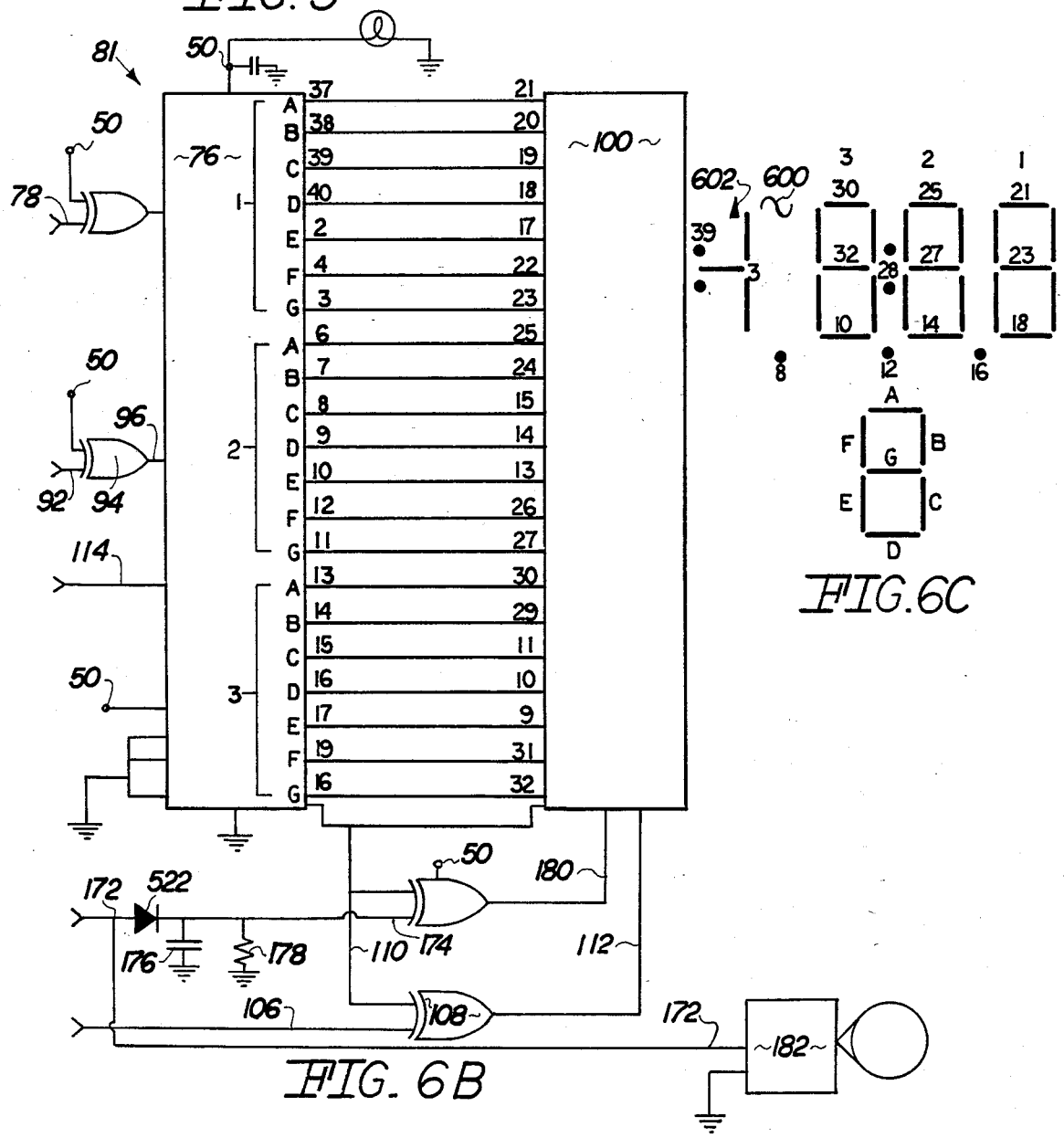
FIG. 6C
FIG. 6B

ALL-WEATHER DIGITAL DISTANCE MEASURING AND SIGNALLING SYSTEM

BACKGROUND OF THE INVENTION

1. Field of the Invention

This system relates generally to systems and methods for measuring & displaying distances, and more specifically to an electronic system of the type including at least one multipurpose ultrasonic wave sending and receiving transducer units for calculating the distances of an obstruction, an electronic device and related circuitry for processing the resulting information into digital signals compatible for digital distance display devices, and a digital display device.

2. Description of the Prior Art

In recent fleet studies, accidents occuring while backing up have cost owners, on the average, $300 per vehicle. This can prove to be an even greater loss for a company when lost business time, higher insurance premiums, and possible law suits are taken into consideration.

Detection devices previously marketed have beeps or flashes indicating, to the driver, obstructions existing to the rear of the operated vehicle. Zone displays are available which visually indicate a generality of the obstruction location only. These signals are representative of warning areas; they do not give any specific insight to the driver whatsoever.

According, there is a need for a vehicular, all-weather digital distance measuring & signalling system to aid the vehicle driver in precise measurements of rearward obstructions, and thus aid in eliminating or, at the least, diminishing the costs of accidents while the vehicle is in reverse motion.

SUMMARY OF THE INVENTION

An object of the present invention is to provide a digital distance display system for an automotive vehicle for enabling the driver to recognize the precise distance of obstructions to the rear of the vehicle through the use of a visual display augmented by an audio tone; thereby preventing damage to the vehicle and other property.

Another object of the invention is to provide a system which is easily installed by the user, and is virtually maintenance free.

More specifically, the digital distance measuring & signalling system comprises three elements: a digital display indicator mounted on the dashboard, three ultrasonic transducer units located on the rear of the vehicle, and a digital converter unit mounted in a convenient and secure location (i.e. in the trunk, below the front seat, etc.). These elements utilize the power of ultrasonic waves and the digital converter circuitry to analyze and report on the information received from the returning waves. Upon shifting the vehicle into reverse, the transducers being to send out cone-shaped ultrasonic waves, and as said ultrasonic waves bounce off an intercepted object they are returned to the transducer with the time elapsed between the moment that a signal has been sent out and when its echoe returns measured by the digital converter unit. This data measured by the digital converter unit is then accurately processed in real time and displayed to the driver, continually updating data due to the decreasing space between the vehicle and the obstacle while backing up; the vehicle is monitored and seen by the driver on said digital display.

Accompanying said visual display of distance is the audio portion of the invention, a beeping sound at specific beep intervals, where said sound beings when said vehicle is 5.9 feet from the rear obstacle, and as the distance between the vehicle and object diminishes, the speed of the beeping sound increases until a distance of 1.9 feet between the vehicle and object is acquired, at which the beeping becomes a solid tone.

Accordingly, the invention comprises the features of construction, combination of elements, and arrangement of parts which will be exemplified in the construction hereinafter set forth, and the scope of the invention will be indicated in the claims.

BRIEF DESCRIPTION OF THE DRAWINGS

The novel and distinctive features of the present invention are set forth in the claims appended hereto. For a fuller understanding of the nature of the present invention, reference should be had to the following detailed description taken in conjunction with the accompanying drawings in which:

FIG. 1 is a side view illustration of the present invention mounted on a vehicle.

FIG. 2 is an overhead plan view of an automotive vehicle equipped with the apparatus of the present invention as also shown in FIG. 1, depicting three cone-shaped ultrasonic waves emitted from transducers mounted to the rear bumper of the vehicle.

FIG. 3 is a partial view of the assembly of FIG. 2 showing the connecting means between the visual distance display device and the control unit and the three transducers at the rear of the vehicle.

FIG. 5 is a quasi-detailed schematic illustrations of the light emitting diode display circuitry with connecting terminals to the control circuitry shown.

FIGS. 6a, 6b & 6c are quasi-detailed schematics of the liquid crystal digital circuitry & display with connecting terminals to the control circuitry & supporting circuitry shown.

DETAILED DESCRIPTION OF THE PREFERRED EMBODIMENT

Figure 4:
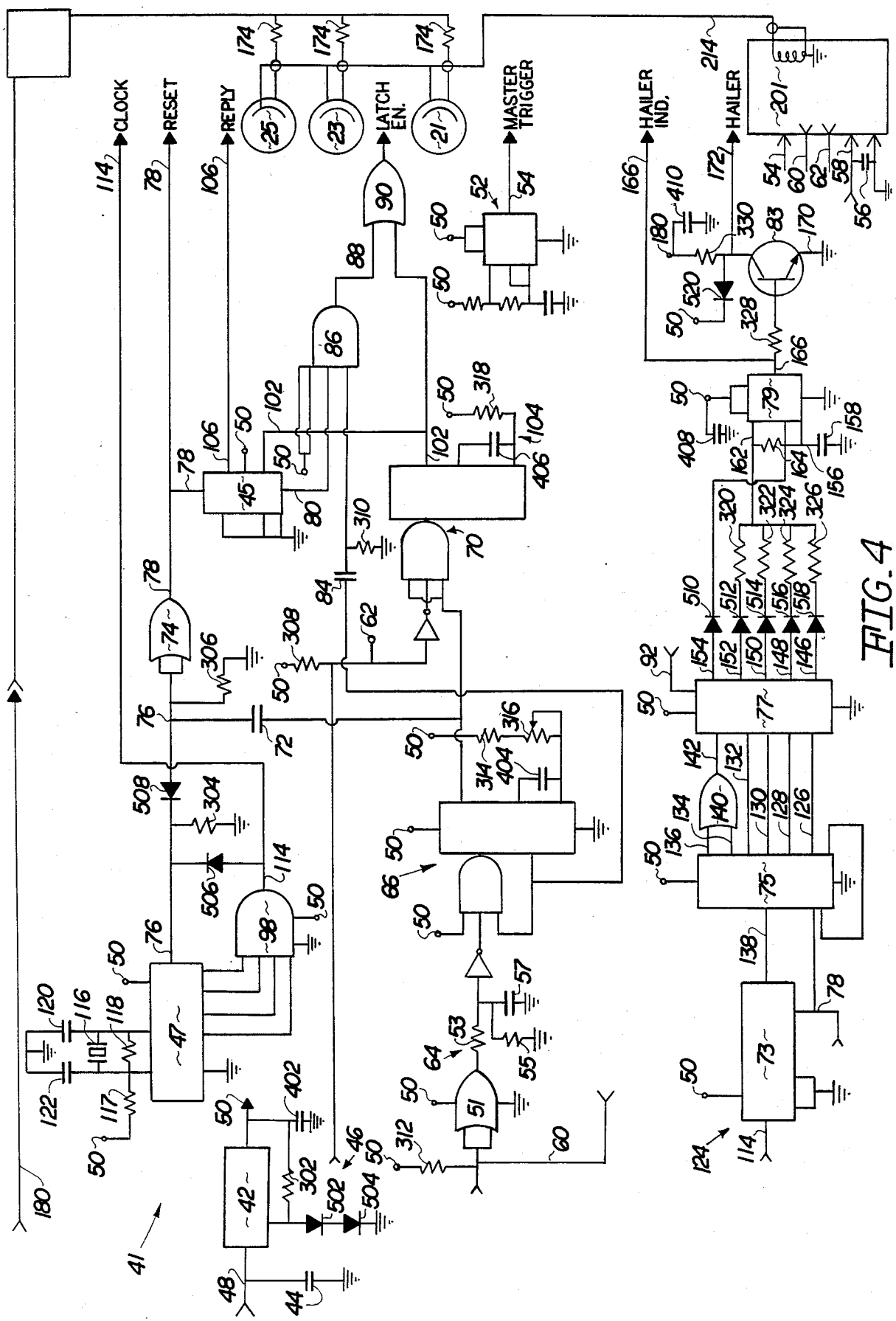
FIG. 4 is a schematic representation of the control circuitry including the connections to the transducers & the thermostat circuitry.

With continued reference to the drawings, wherein like reference numerals have been used throughout to designate like elements, FIGS. 1 & 2 show a side & overhead view, respectively, of a truck installed with an all-weather digital distance measuring & signalling system designated generally by reference numeral 11, while said truck is in the process of backing up. During the process of backing up the detection system 11 emits ultrasonic waves which emanate outwardly in a conic shape as shown & having a dispersion angle of sixty degrees.

Referencing FIGS. 2 & 3, it is seen that the distance measuring & signalling system 11 comprises (3) environmental ultrasonic transmitting/receiving units 13, 15 &

17, such as modified versions of the Polaroid ultrasonic t/r units, Patent # unknown, which are attached sequentially and fixed to the rearward portion of said vehicle and spaced approximately equi-distant apart in order to reduce the blind areas 19 to nominal distances of less than one (1) foot long cones. A series of ultrasonic waves are synchronously emitted & received by each t/r unit 13, 15, & 17 through their respective transducers 21, 23, & 25. A control unit 33 records the time of emission & reception of the ultrasonic waves, computes the distance of the nearest rearward obstruction, and sends appropriate signals to a digital/audio display unit 101.

More specifically, the control unit 33 houses control circuitry, generally designated by numeral 41. The primary portion of the control circuitry 41 is powered by the connection of insulated leads 37 & 39 to the live 12VDC wire connected to the back-up lights and the frame of said vehicle, respectively. A secondary portion of the control circuitry is powered by the connection of insulated lead 38 to the live 12 VDC wire connected to the ignition of the vehicle.

A power supply 42 (ID 7805) receives the 12 VDC from the lead 37 as input at lead 48 and provides a 6.2 VDC output at lead 50 to the balance of the control circuitry at an average of .150 mA w/ 2.5 A peaks when transducers transmit. The input 12 VDC is first filtered by a 0.1 mfd capacitor 44; and, the 6VDC output from the power supply 42 is secondly filtered by filter circuitry consisting of two diodes, a 560 ohm resistor, & 470 mfd capacitor and generally referred to as 46. The first filter 44 acts to maintain a constant 12 VDC during short periods of excess or deficient voltage being transmitted from the electrical circuitry of the vehicle and damaging the control circuitry; and the second filter 46 acts to prevent spikes from being returned from the tr/rec units during operation of the transducers and damaging the balance of the control circuitry.

Figure 8:
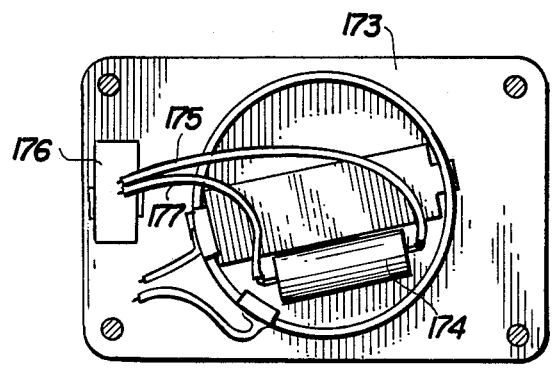
FIG. 8 is a rear view depicting an environmental heating component of the transducer device.
Figure 9:
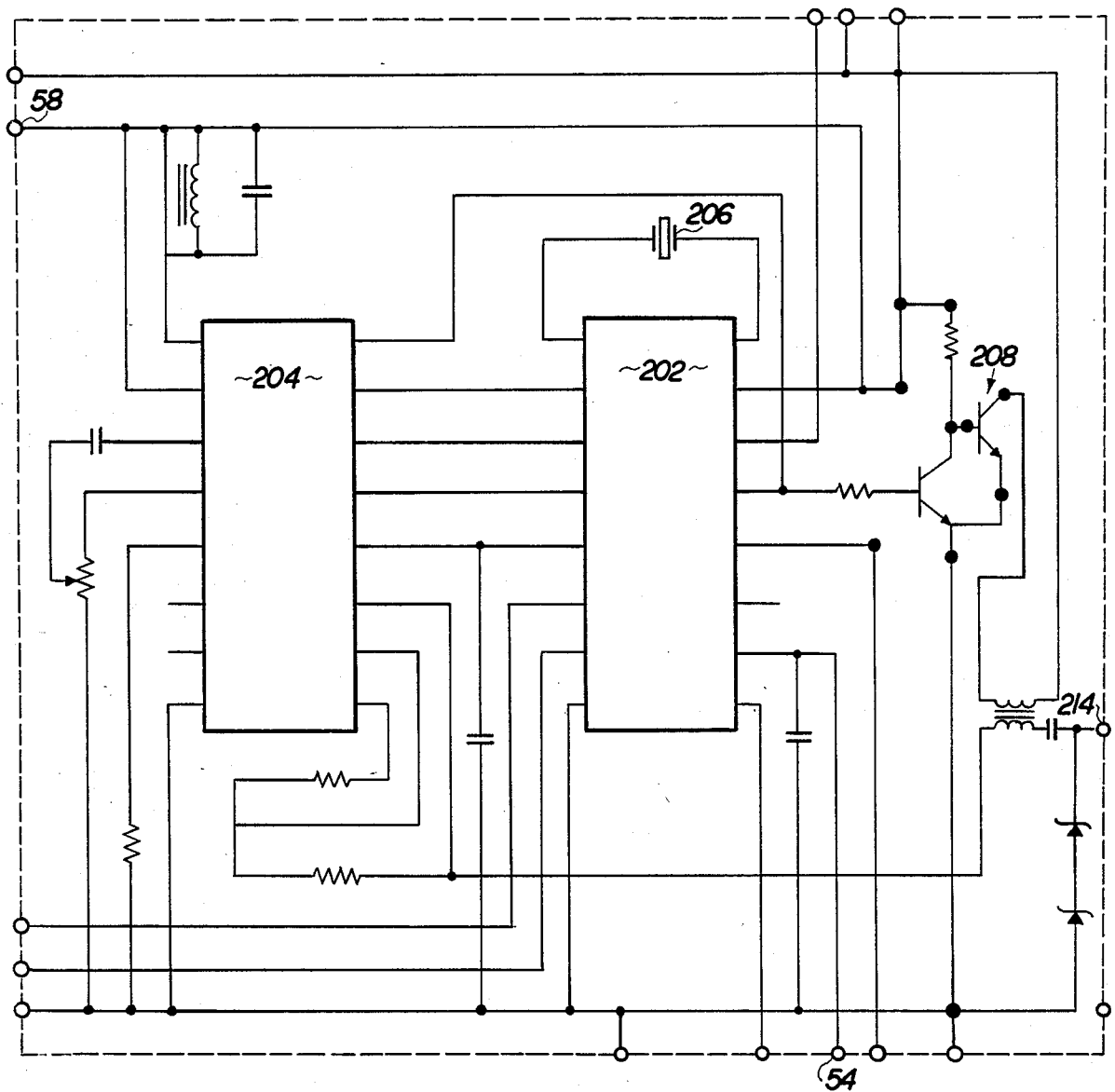
FIG. 9 is a schematic representation of Polaroid's transmitting/receiving circuitry found within one of the transducer devices including the connections to the transducers & control unit.

An i.c. 555 timer, generally referred to as 52, receives input from lead 50 at two locations & includes RC circuitry as shown. The timer 52 provides output in the form of 6.2 VDC pulses at 250 ms intervals from lead 54 to Pin 10 of digital i.c. 202 in the tr/rec circuitry 201, where the detailed schematic of Polaroids's tr/rec circuitry 201 is shown in FIG. 8 & the tr/rec circuitry 201 as modified is shown in FIG. 4A. An additional 6 VDC supply is delivered at lead 58 from lead 50 to Pin 13 of digital i.c. 202 through a 68 mfd capacitor 56, which is placed across Pins 13 & 9 of digital i.c. 202.

Upon receipt of 6 VDC pulse, the digital i.c. 202 together with an analog i.c. 204, a 420 kHz ceramic resonator 206, & amplifier circuitry, designated generally by numeral 208, send a 50 kHz pulse of 1ms width w/250 ms spacing between pulses at 300 Vac to a pulse transformer 210 limited by a pair of 150 V zener diodes, generally designated as 212. The result being that a signal is provided to the transducers from lead 214 and the transducers send an ultrasonic signal. Additionally, and simultaneously with the transmission of the sound wave, 0 VDC (or low) signal is sent to lead 60 (or PIN 12 of digital i.c. 202) & a 6.2 VDC (or high) signal is sent to lead 62 (or Pin 15 of digital i.c. 202).

The spacing between pulses permits the first returned signal from the transducers 21, 23, & 25 to be returned along the same circuitry & re-translated into a DC signal usable by the control circuitry at Pins 12 & 15 digital i.c. 202. The DC signal is returned to lead 60 from Pin 12 of i.c. 202 at a 6.2 VDC (or high value ) and to lead 62 from Pin 15 of i.c. 202 at a 0 VDC (or low value). The configuration of the tr/rec circuitry 201 results in a rejection of all but the first returned signal from the transducers 21, 23 & 25.

As a further teaching of the tr/rec circuitry 201 as shown in FIG. 4, it should be noted that the capacitor 56 provides a modification of the Polaroid tr/rec circuitry 201 which acts to prevent loading down of the 6.2 VDC signal 4 VDC during transducer transmission and degradation of the radiated power by the transducer of approximately 50 percent depending on the length of electrical connections between the control circuitry 41 & tr/rec circuitry 201. The resulting increased ultrasonic signal develops a transmitted sound wave with a cone diameter (or beam width) approximating 60 degrees over a measured distance of 10 feet and acts to reduce blind areas 19.

Upon transmission of the sound wave, lead 60 is energized with 0 VDC which acts to reset all values. Specifically, the lead 60 connects to a logical 'OR' gate 51 (ID 4071) and provides the gate 51 with a 0 VDC value at both of its input terminals. The 0 VDC does not meet the 'OR' test and 0 VDC is passed to a filter circuit 64 comprising a 4.7k ohm resistor, a 2.2k ohm resistor & a 0.022 mfd capacitor, as shown. The gate 51 acts as a buffer to prevent the filter 64 from back discharging. The filter 64, in turn, acts to clean up any ripple in any pulsed signal which is passed to it, reduce a 6.2 VDC pulsed signal to a 1.2 VDC pulse of 1ms, and send the reduced signal to a first 'One-shot' i.c. receiver (ID 74123); generally referred to by numeral 66 and comprising an inverter, logical 'AND' gate & i.c. chip. The 'one-shot' 66 is energized by the 0 VDC pulse (the inverter taking the low signal & inverting it to a high signal of 6.2 VDC) and remains 'ON' for 17.7 ms (which is equivalent to a distance of an obstruction equivalent to 10 feet), maintaining a high value of 6.2 VDC for a period of 17.7 ms at lead 68 (or Pin 13 of the 'one-shot' 66). While energized, lead 68 connects directly to two of three inputs of the logical 'AND' gate embedded in a second 'one-set' i.c. receiver (ID 74123), generally referred to by numeral 70. Thus, the 'one-shot' 70 holds two high values at its input for a period of 17.7 ms & waits for an inverted third high value input from lead 62 in order to the 'one-shot' 70 to be activated. Simultaneously, a 4700 pfd capacitor 72 is charged, and, establishes a 6.2 VDC 4-ms pulsed input to the reset terminal of i.c. 47 (ID 4060) & to the logical 'OR' gate 74 (ID 4071) through lead 76. The high signal to the gate 74 meets the test and passes a high signal to the rest terminals of the SR flip-flop 45, the counter-latch driver driver i.c. 74 (ID 7224), the i.c. 73 (ID 4017), & the i.c. 75 (ID 4017) through lead 78. The reset operation results in all registers being zeroed momentarily & coincides with the transmission of the sound waves from the transducers 21, 23 & 25. Additionally, when the SR flip-flop 45 is reset, the lead is energized with a high value.

At the end of the 17.7 ms period, the 'one-shot' 66 shuts down and sends a return high signal to lead 82 (Pin 4 of i.c. chip) of 6.2 VDC pulsed. The lead 82, in turn, charges the 4700 pfd capacitor 84, and the capacitor 84 sends a 6.2 VDC 1-2 ms pulse to the logical 'AND' gate 86. Prior to this time, the other three terminals of the gate 86 were set high as discussed above in the reset operation & as by the connection of two of the terminals to the lead 50. Thus, the condition is met at gate 86 and a 6.2 VDC pulse is passed along lead 88 to the logical 'OR' gate 90 (ID 4071). The condition is thereby met at gate 90 and a high signal is pulse along lead 92 to the exclusive 'OR' gate 94 (ID 4070). The condition being met at gate 94, the signal is inverted from a high to a low value which is transmitted on lead 96 to Pin 34 of the counter-latch driver i.c. 76. This causes the release of the information on the counters in the i.c. 76 to be passed to the LCD display.

Now looking backward, it can be seen that the counters in the i.c. 76 are connected by lead 114 to the oscillator divider i.c. 47 (ID 4060) and a logical 'AND' gate 98 (ID 4082) through which a pulse is transmitted from a 4 MHz crystal oscillator 116. The oscillator 116 & divider 47 are properly coupled with two 1M ohm resistors & 100 pf capacitors, 117, 118, 120, & 122, respectively. Said pulsed signal is divided by 614 by the oscillator divider 47 giving a 5600 Hz clock cycle which is received & counted by the counters (where 1 pulse is equivalent to a 0.1 foot increment). The result is that at the end of 17.7 ms, a default will result in 100 pulse having been counted and displayed on the LCD Display 100 to a first decimal accuracy of '10.0' ft.

In the event that a signal is sent out low from line 62 at 0 VDC within the 17.7 ms time frame the rec/trans circuitry, then the second 'one-shot' 70 inverts the low signal to a high signal at the logical 'AND' gate. The logical 'AND' gate in the 'one-shot' 70 will already have high vales at the other two inputs as developed by the first 'one-shot' 66 & discussed above. Thus, the condition will be met at the gate of i.c. 70 and the signal will be processed. This signal permits the i.c. 70 to become operational, and, together with the RC circuitry 104 comprises a 0.1 mfg capacitor & 1 k ohm resistor yields a 6.2. VDC 4 ms pulsed value being sent through lead 102(Pin 5 of i.c. 70). The signal from i.e. 70 is sent to the 'OR' gate 90, which meets the gate condition & is sent to lead 92 (latch enable). Simultaneously, the signal from i.c. 70 is sent to the SR flip-flop 45 (Pin 8) which resets the SR flip-flop. This results in lead 80 (Pin 12) to go low (0 VDC) and lead 106 to go high (6.2 VDC pulsed). The high signal on lead 106 is delivered to the exclusive 'OR' gate 108 and coincides with a constant chopper signal which is sent from an internal oscillator of i.c. 76 through lead 110 to the second input of the gate 108. The result being that a chopped signal is synchronized at the output lead 112 and delivered to the LCD Display 100 causing a delta character to be displayed. The display of the delta character indicates tha a valid reply has been received (i.e. that an obstruction has been found within 10 feet of the rear of the vehicle).

Referring back to gate 90, when the lead 92 is set high after receiving a return signal within the 17.7 ms time frame, a 4 ms pulsed signal is sent to gate 94. A aforestated, upon receipt of the high signal at gate 94 on lead 92, the gate inverts the signal to a low (0 VDC) value causing the information stored in the counters of i.c. 76 to be displayed.

As a further warning to an operator of said vehicle, a series of audio beeps & visual signalling are provided by hailer circuitry, generally referred to as 71, which is interconnected & part of the control circuitry 41. Referring back to the energizing of leads 78 (reset) & 92 (latch enable), it can be seen that simultaneously with the sequence of responses developed to result in a digital distance read-out of the distance of an obstruction, the lead 78 first resets a divide by 10 counter 73 (ID 4017) & counter i.c. 74(ID 4017) and then lead 92 carries a high 6.2 VDC pulsed signal to a six-bit latch i.c. 77 (ID 74174). This response causes the i.c. 77 to force the release of information from counter i.c. 75 along one of the leads 126, 128, 130, 132, 134, or 136. A high value on a given lead is dependent on footage determined by counters embedddeded in counter i.c. 75 at one foot intervals commencing at five feet with lead 126 and ending at zero feet with lead 131.

The counters in i.c. 75 are initiated by the 5600 Hz clock pulse generated from the oscillator 116 & divider 47 circuitry and delivered through the divide by 10 counter 73 by lead 138. The effect of the divider 73 is to take the clock pulse corresponding to 0.1 foot increments, to wait until there are ten pulses before setting the second counter of i.c. 75 connecting lead 138, and to continue to set the various counters up to the five foot mark represented by lead 126. As each counter is set, the previous counter is zeroed. In the event, that the distance of an obstruction exceeds five feet, all of the respective leads will be set to zero (or will transmit a low 0 VDC value). Furthermore, if the distance of the obstruction is zero or one foot, a logical 'OR' gate 140 (ID 4071) will permit the transmission of a signal only along a single lead 142.

Upon energizing of lead 92, the latch 77 causes the counter 75 to release its information through the latch 75 to corresponding leads 146, 148, 150, 154, & 156. Said leads carry their signal to a hailer oscillator 79 (ID 555) through paths carrying various resistances of 0, 15 k, 68 k, 150 k, & 470 k ohm, respectively, and across an RC path 156 carrying a 27 k ohm resistor 164 & a 1 mfd capacitor 158 corresponding to a time constant network. As a result of the separate resistances on the respective paths, the capacitor charges to varying levels. Upon charging the capacitor 158, a signal is permitted to pass to the hailer oscillator 79 through lead 160. This causes lead 162 to become grounded and discharged capacitor 158 through the connecting resistor 164. During the period of discharge of the capacitor 158, a signal is sent along lead 166 and the length of the signal depends on the time to discharge which varies according to the amount of voltage stored by the capacitor 158. The signal is transmitted through a 1k ohm resistor to the base of a BJT transistor 83 which turns the transistor 83 'ON' and results in the collector voltage being drawn to ground through the emitter (i.e. from lead 168 to lead 170). This causes a low (0 VDC) signal to be transmitted along lead 172. This permits the 1 mfd capacitor 176 to discharge through the 47 k ohm resistor 178. As this discharge occurs, the signal on lead 74, along with the chopped signal along lead 110, will meet the condition of the exclusive 'OR' and be passed through along lead 180 to the display panel 100 causing a sinusoidal symbol to be displayed. Finally, it can be seen from FIG. 4 that when lead 172 is low (or grounded during the discharge of capacitor 158), the hailer 182 will be turned 'OFF' and when the lead 172 is high (or during periods when the transistor 83 is turned off), the hailer 182 will be turned 'ON' and a further signal will be sent to the display unit 111 along lead 180 indicating a validation of an obstruction within six (6) feet. The result being that a constant tone will occur when an obstruction is less than two feet away and that a beeping tone will be heard if the obstruction is less than six feet away which will get faster as the vehicle comes closer to an obstruction until finally a solid tone occurs; and, a further visible symbol of a sinusoid 600 will be displayed to indicating the presence of an obstruction within the six foot range.

Additional resistors (300's), capacitors (400's), & diodes (500's), which have heretofore not been referenced, but which are shown in the accompanying figures are specified as follows: 560 ohm resistor 302; diodes 502 & 504; 470 mfd capacitor 402; diodes 506; 4.7 k ohm resistor 304; diode 508; 4.7 k ohm resistor 306; 4.7 k ohm resistor 308; 4.7 k ohm resistor 310; 4.7 k ohm resistor 312; 15 mfd capacitor 404; 2.2 k ohmn resistor 314; 2 k ohm variable resistor 316; 1 k ohm resistor 318; 0.1 mfd 406; diodes 510, 512, 514, 516, 518; 15 k ohm resistor 320; 68 k ohm resistor 322; 150 k ohm resistor 324; 470 k ohm resistor 326; 0.1 mfd capacitor 408; 1 k ohm resistor 328; diode 520; 0.1 mfd capacitor 410; 1.2 k ohm, 1W resistor; & diode 522.

The preferred embodiment of the digital display unit 101 anticipates the utilization of the LCD digital display configuration shown in FIG. 6A, 6B & 6C and has been substantially addressed in the foregoing discussion.

Figure 7:
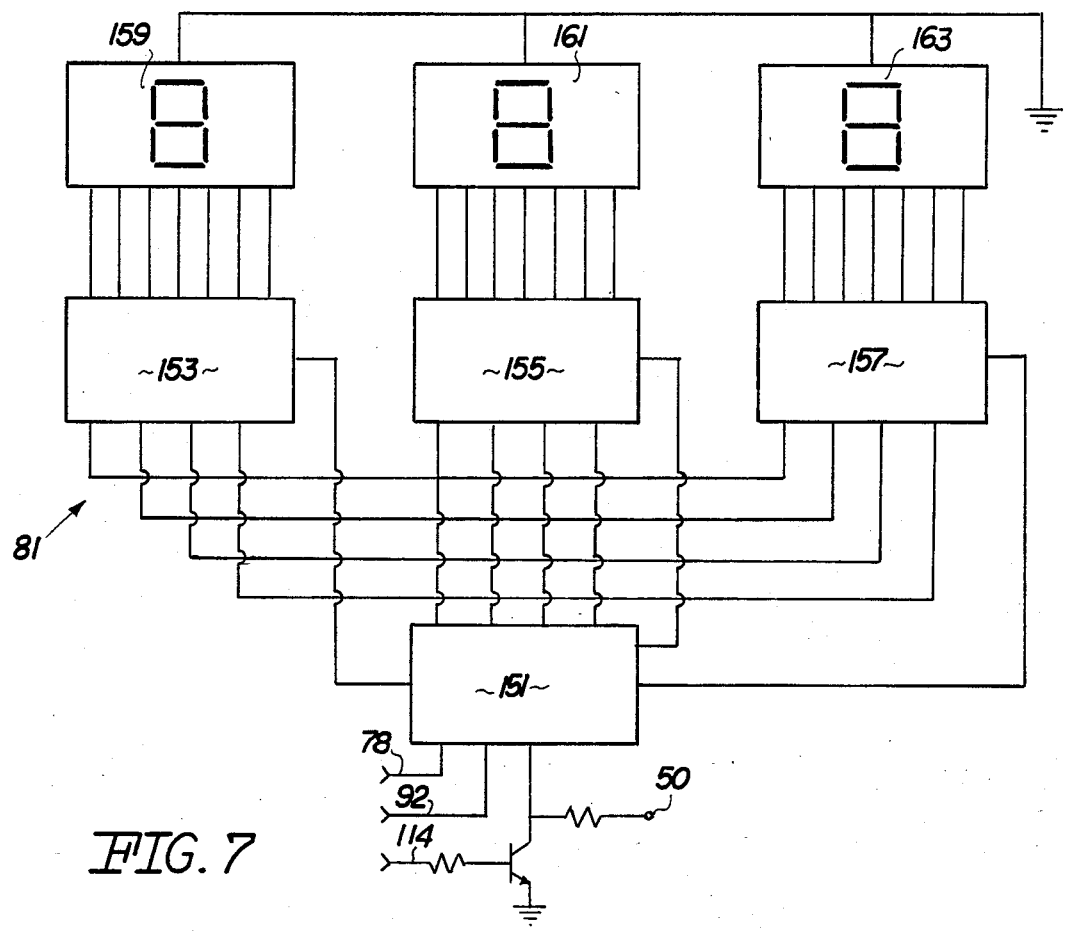
FIG. 7 is a quasi-detailed schematic of the incandescent digital display circuitry.

A second embodiment of the digital display unit 101 anticipates the use of the incandescent display as shown in FIG. 7 where signals transmitted from the the control circuitry are input to a first digital converter integrated circuit 151 where they are translated into binary code. The binary code is divided into a series of three strings representing the first, zeroth, & negative first powers of ten. Said strings are transmitted to the translator integrated circuits 153, 155, & 157. The strings of binary bits are then translated into decimal characters illuminating the appropriate portions of the crystals 159, 161, & 163, respectively.

A third embodiment of the digital display unit 101 anticipates the use of an LCD display as shown in FIG. 5.

An enhancement of the ranging unit 13 is shown in FIG. 8 where the transducers 21, 23 & 25 are supplemented with 40 ohm, 5 W heating resistors 174 which are fixed to the inside portion of the front plate 173 of the ranging units 13, 15, & 17. The resistors 174 are connected by leads 175 & 177 to the wiring of the ignition lights and provides heating to dissolve any ice or water build-up along the transducer which would prevent operation of the ranging unit. A 10 degrees celsius closed thermostat 176, such as is commercially available, is attached to plate 173 and connected in the resistive heating circuit permitting flow of current below 10 degrees celsius & preventing current from flowing above 37.5 degrees celsius.

In order to facilitate installation & usage, a coaxial cable 107 connects the visual display device 101, which is standardly mounted on the dashboard, to the coaxial cable 109 extending from the control unit 33 through the use of male/female connectors 103 & 105. The control unit 33 is commonly secured in the trunk or under the driver'seat. The black wire 39 emerging from the control unit 33 serves as the ground wire and by use of an eyelet connector (not shown) is fastened to any metal surface not rubber mounted. The red wire 37 emerging from the control unit is connected to the hot wire coming from the transmission switch or reverse light by use of a scotchlock connector (not shown). The ranging units 13, 15, & 17 are mounted approximately one foot six inches in from side of vehicle by using the two mounting studs 111 & 113. The coaxial cables 27 is plugged into the ranging units 13 & 15. The ranging 13, 15, & 17 are connected to the control unit 33 by the interconnection of male/female pins 115 & 117 extending at the ends of the coaxial cables 31 & 32, respectively.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A digital distance measuring & signalling system for a motor vehicle, such as a truck or automobile, comprising:

a transducer means both for receiving a pulsed electrical signal and generating a pulsed ultrasonic wave from said pulsed electrical signal and transmitting said ultrasonic wave, and, for receiving an ultrasonic wave and generating a pulsed electrical signal from said ultrasonic wave;

an output signal means for generating an output signal corresponding to the distance of an obstruction from the transducer means as determined from the time lapse interval between the transmission & reception of the ultrasonic wave;

a digital display means responsive to a varying output signal for producing a visual digital display &/or audible sounds;

a pulse generator means for producing a pulsed signal and transmitting said pulsed signal to the transducer means;

means for sending selected signals to the respective transducer means, output signal means, digital display means, & pulse generator means;

means for sending a signal from said pulse generator means to said transducer means;

means for sending a signal from said transducer means to said output signal means; and, means for sending a signal from said output signal means to said digital display means.

2. A distance measuring & signalling system as set forth in claim 1, wherein said transducer means comprises:

a plurality of transducer units for both simultaneous transmitting of pulsed ultrasonic waves, and, concurrent reception of returned waves from one or more obstructions; said transducer units converting returned waves into corresponding electrical pulses; and transmitting/receiving means for converting transmitted pulsed electrical signals from the pulsed generator means into a pulsed electrical signal, and, for converting a first returned electrical pulse from said transducer units into a return pulsed electrical signal for delivery to said means for generating an output signal.

3. A distance measuring & signalling system as set forth in claim 1, wherein said transducer means includes:

transmitting/receiving means; said transmitting/receiving (t/r) means including a capacitor;

a first means for connecting said t/r means to the positive terminal of said d.c. voltage connecting means; said d.c. voltage being suitably selected to provide the requisite voltage to energize the t/r means;

a second means for connecting said t/r means to a ground; and, means for connecting said capacitor across said first & second means;

said capacitor having capacity selected so that, when the d.c. voltage source means & pulse generator means are connected to the transducer means by the connecting means, said capacitor repetitively charges to the requisite voltage and then discharges through the t/r means as the transducers draw power to transmit ultrasonic waves, whereby each discharge of said capacitor serves to maintain the d.c. voltage across said first & second means during transducer transmission and reduces degradation of wave transmissions over the operative range.

4. A distance measuring & signalling system as set forth in claim 1, wherein said output signal means includes sensing means for sensing whether the distance of an obstruction is within a pre-determined range, and, for producing a corresponding confidence output signal; and, means connecting the sensing means to the display means, whereby a visual symbol will be displayed by the display means when the distance of an obstruction is within the pre-determined range.

5. A distance measuring & signalling system as set forth in claim 1, wherein said digital display means comprises an LCD digital display means.

6. A distance measuring & signalling system as set forth in claim 1, wherein said digital display means comprises an LED digital display means.

7. A distance measuring & signalling system as set forth in claim 1, wherein said digital display means comprises an incandescent digital display means.

8. A distance measuring & signalling system as set forth in claim, wherein said distance measuring & signalling system includes:

a control unit for housing said output signal means, pulse generator means, & d.c. voltage source means;

at least one t/r unit for housing said transducer means; and, a digital/audio display unit for housing the digital display means.

9. A distance measuring & signalling system as set forth in claim 8, wherein said connecting means include coaxial cables & coupling means between said units for shielding transmissions.

10. A distance measuring & signalling system as set forth in claim 8, wherein said transducer means comprises a transmitting/receiving means, a plurality of transducers, & means for connecting the transducers to the transmitting/receiving means;

said transducers being housed in separate transducer units; and said transmitting/receiving means being housed in one of the transducer units.

11. A distance measuring & signalling system as set forth in claim 10, wherein said connecting means include coaxial cables & coupling between said units for shielding transmission.

12. A distance measuring & signalling system as set forth in claim 1, wherein said means for sending selected signals includes means for connecting to the back-up light wiring of said vehicle to power said distance measuring & signalling system.

13. A distance measuring & signalling system as set forth in claim 1, wherein said means for sending selected signals comprises a power supply means for receiving power from the pre-selected voltage source & producing a pre-selected voltage for transmission to said transducer, output signal, digital display, & pulse generator means;

a first filter means for filtering the incoming signal from the pre-selected voltage source and delivering the filtered signal to the power supply; and a second filter means for preventing spikes from being bounced internally to the respective means.

14. A distance measuring & signalling system as set forth in claim 1, wherein said pulse generator comprises a timer for chopping the received d.c. voltage into pulse at a pre-selected frequency.

15. A method for installation of a distance measuring & signalling system in a vehicle whereby a control device is placed or fastened under the driver'seat, in a storage trunk or similar location of a vehicle; said control device is connected by connecting means to the positive terminal of wiring connecting the back-up lights of said vehicle and is connected by connecting means to either a ground (or negative) terminal wire of said back-up lights or to a metal piece grounded (or connected) to the frame of said vehicle;

at least one transducer unit is attached as with nuts & bolts or similar fastening means to the rear bumper or portion of the vehicle with the transducer unit or units aligned so that the transducer signal may emanate in the direction of rearward motion;

a digital display is fixed as with two sided adhesive tape or similar fastening means to the dashboard of the vehicle & readily visible to an operator of said vehicle; and, wiring is used to connect the digital display to the control unit, and, the control unit the transducer unit.

16. A method for installing a distance measuring & signalling system as set forth in claim 15, wherein said connecting wiring comprises coaxial cable.

17. A digital distance measuring & signalling system for a motor vehicle, such as a truck or automobile, comprising:

a transducer means both for receiving a pulsed electrical signal and generating a pulsed ultrasonic wave from said pulsed electrical signal and transmitting said ultrasonic wave, and, for receiving an ultrasonic wave and generating a pulsed electrical signal from said ultrasonic wave;

an output signal means for generating an output signal corresponding to the distance of an obstruction from the transducer means as determined from the time lapse interval between the transmission & reception of the ultrasonic wave;

a digital display means responsive to a varying output signal for producing a visual digital display &/or audible sounds;

a pulse generator means for producing a pulsed signal and transmitting said pulsed signal to the transducer means;

means for sending selected signals to the respective transducer means, output signal means, digital display means, & pulse generator means;

means for sending a signal from said pulse generator means to said transducer means;

means for sending a signal from said transducer means to said output signal means;

means for sending a signal from said output signal means to said digital display means;

a heater means for heating the transducer means during operation of said vehicle and when the transducer temperature is within a pre-determined temperature range; said heater means comprising at least one heating element;

means for connecting the heater means to a pre-selected voltage source; and means for connecting said heating element to the transducer means.

18. A distance measuring & signalling system as set forth in claim 17, wherein said transducer means includes a plurality of transducers, said heater element comprising a sufficient number of resistors to at least correspond to the number of transducers;

means for sensing when the transducers are within the pre-selected temperature range;

means for permitting the flow of electricity while said transducers are within said temperature range & preventing flow outside of said range;

means connecting each resistor to a corresponding transducer;

means connecting each resistor to the sensing means; and means connecting the sensing means to said pre-selected voltage source.

19. A distance measuring & signalling system as set forth in claim 17, wherein said pre-selected voltage source comprises connecting means for connecting to the ignition wiring of said vehicle.

20. A digital distance measuring & signalling system for a motor vehicle, such as a truck or automobile, comprising;

a transducer means both for receiving a pulsed electrical signal and generating a pulsed ultrasonic wave from said pulsed electrical signal and transmitting said ultrasonic wave, and, for receiving an ultrasonic wave and generating a pulsed electrical signal from said ultrasonic wave;

an output signal means for generating an output signal corresponding to the distance of an obstruction from the transducer means as determined from the time lapse interval between the transmission & reception of the ultrasonic wave;

a digital display means responsive to a varying output signal for producing a visual digital display &/or audible sounds;

a pulse generator means for producing a pulsed electrical signal and transmitting said signal to the transducer means;

means for sending selected d.c. signals to the respective transducer means, output signal means, digital display means, & pulse generator means;

means for sending a signal from said pulse generator means to said transducer means;

means for sending a signal from said transducer means to said output signal means; and, means for sending a signal from said output signal means to said digital display means;

said digital display means includes a means for receiving pulsed signals & storing the number of pulses, and, said output signal means includes digital control circuitry including means for receiving a signal from said transducer means at the time of transmission of an ultrasonic wave;

means for simultaneously resetting said electronic components of the digital & audible control circuitry;

a first receiver means for setting a pre-selected timed interval;

a means for chopping the d.c. voltage into pre-selected pulsed signals corresponding to 0.1 foot intervals;

means for delivering said pulsed signals to said digital display means;

a means for forcing the release of the stored information of the digital display means at the end of said interval, if no returned signal received from said transducer means during said interval; and a means for forcing the release of the stored information of the digital display means during said pre-selected interval, if a returned signal is received from said transducer means within said interval; and audible control circuitry including a means for chopping the d.c. voltage into pre-selected pulsed signals corresponding to 0.1 foot intervals;

counting means for counting the number of pulsed signals;

a means for forcing the release of the stored information during said pre-selected interval, if a returned signal is received from said transducer means within said interval;

separated path means for transmission of said information depending upon a pre-determined number of counted pulses corresponding to the distance of an obstruction; and, a beeper means;

said separate path means acting to lengthen or shorten a pulsed signal which is sent to the beeper means, which is turn issues an audible signal corresponding to the length of the transmitted pulsed signal.

* * * * *